Mar. 13, 1923.
F. E. CARALUN.
ATTACHMENT FOR THROTTLE LEVERS.
FILED FEB. 3, 1920.
1,448,332.
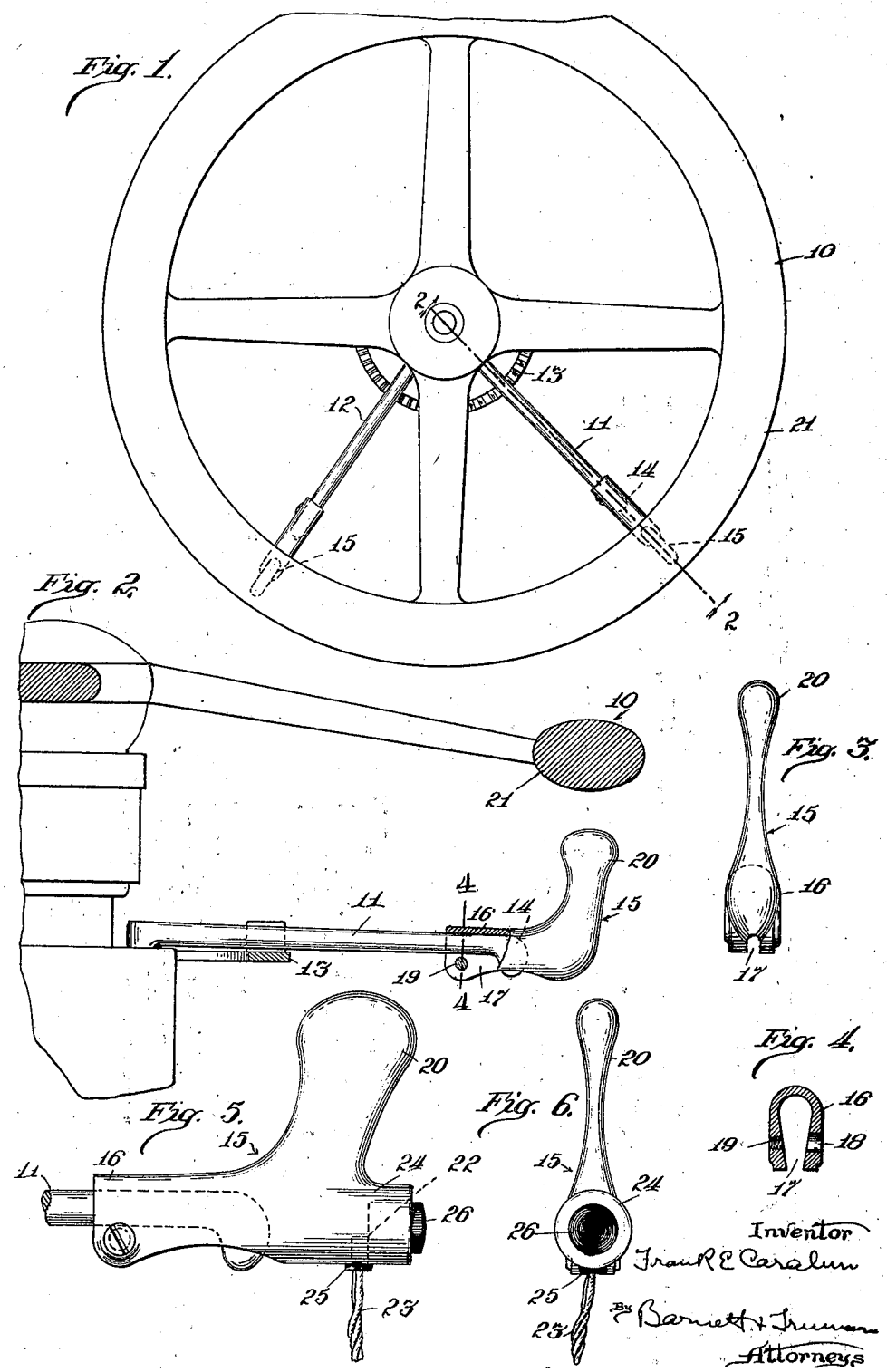

Patented Mar. 13, 1923.

1,448,332

UNITED STATES PATENT OFFICE.

FRANK E. CARALUN, OF CHICAGO, ILLINOIS.

ATTACHMENT FOR THROTTLE LEVERS.

Application filed February 3, 1920. Serial No. 356,055.

*To all whom it may concern:*

Be it known that I, FRANK E. CARALUN, a citizen of the United States, residing at Chicago, in the county of Cook and State of Illinois, have invented certain new and useful Improvements in Attachments for Throttle Levers, of which the following is a specification.

This invention relates to improvements in motor control levers for automobiles and particularly to an attachment for the throttle lever of automobiles of the Ford type.

In machines of this type the throttle is not controlled by a foot pedal or accelerator but only by a throttle lever on the steering post below the steering wheel. When, as often is the case, a larger steering wheel is substituted for the one with which the car is provided, or when the steering wheel is raised above its usual position to provide the car with a steering lock on the steering post, the throttle lever is then inaccessible unless the driver removes one of his hands from the steering wheel in order to reach the lever. This does not permit the fineness of adjustment of the position of the throttle lever necessary to the proper running of the motor. Moreover, the steering of the machine at such times by only one hand increases the possibility of accidents.

The invention has for its primary object to provide an adjustable attachment to the throttle lever and also the spark lever if desired, whereby the same may be easily reached and moved by the fingers without removing the hands from the steering wheel.

A further object is to provide means for locating an electric switch or push button which may be readily touched without removing the hands from the steering wheel.

The invention consists in the novel arrangements, combinations and devices for carrying out the above stated objects and such other objects as may appear from the following description of preferred embodiment of the invention illustrated in the accompanying drawing, wherein—

Fig. 1 is a top plan view of an enlarged steering wheel and control levers provided with the extension device.

Fig. 2 is a fragmentary section along the line 2—2 of Fig. 1 showing the location of the extension device with respect to the rim of the steering wheel.

Fig. 3 is an end view of the attachment.

Fig. 4 is a cross section on the line 4—4 of Fig. 2 of the device when removed from the throttle lever.

Fig. 5 is a modified form of attachment provided with an electric push button, and Fig. 6 is an end view of the device shown in Fig. 5.

Like characters of reference refer to like parts in the several figures of the drawing.

For the purpose of illustrating the invention I have shown a conventional type of steering wheel 10 and below the same a throttle lever 11 and spark lever 12 secured in any well known manner to the steering column and adapted to be oscillated about an axis substantially coinciding with that of the steering post. A quadrant 13 is attached to the steering post and bears against the levers for the purpose of holding them in adjusted position. This construction is typical of that used in the Ford type of automobile in which the throttle is controlled entirely by means of the throttle lever 11. It is customary to adjust the throttle lever by moving the same with the fingers without releasing the grasp on the steering wheel. When a larger steering wheel is used or when the steering wheel is raised above its normal position because of the attachment of a lock to the steering column the end 14 is not within reach of the fingers without releasing the grasp of the hand from the steering wheel. In such cases it becomes necessary to release the grasp on the steering wheel with one hand in order to adjust the throttle lever.

The attachment 15 herein shown consists of a hollow body 16 split longitudinally as shown at 17. The interior of the body conforms to and is adapted to receive the end of the throttle lever as indicated in dotted lines in Fig. 2. The body is drilled and threaded transversely as shown at 18 and 19 to receive a screw for the purpose of clamping the same on the throttle lever. The body is adjustable longitudinally on the throttle lever so as to position the handle 20 directly below the rim 21 of the steering wheel. The length of the handle 20 is so proportioned that a space remains between the handle and the rim of the steering wheel to allow for passage of the fingers during the steering of the machine. It is sufficiently close to the rim, however, so that it may be grasped by the fingers without removing the hands from the steering wheel.

In Figs. 5 and 6 I have shown a modification of the attachment wherein the same is provided at its end with an electric push button switch 22 having leading out wires 23 adapted to connect electrically with an electric horn or a dimmer as may be desired. The switch 22 is of any suitable standard type and is inserted within a hollow space in the end 24 of the attachment. The leading out wires pass through an opening which is provided with an insulating collar 25. The switch is provided with a button 26.

If desired an attachment 15 may be placed on the spark lever 12 as shown in Fig. 1, but this construction is optional inasmuch as the adjustment of the spark lever is not frequently altered.

I claim:

An extension for throttle and spark controlling arms arranged beneath the steering wheel of an automobile, comprising a horizontal portion recessed to receive the end of said arm, and a second portion extending up to directly beneath the wheel rim and in close proximity thereto so as to be engaged between the fingers of the hand of the operator without releasing the rim of the wheel.

FRANK E. CARALUN.